United States Patent [19]
Bosshard

[11] Patent Number: 5,421,460
[45] Date of Patent: Jun. 6, 1995

[54] EMERGENCY EQUIPMENT FOR MOTOR VEHICLES

[76] Inventor: Charles Bosshard, Buchenweg 25, CH-3263 Büetigen, Switzerland

[21] Appl. No.: 108,575
[22] PCT Filed: Dec. 12, 1992
[86] PCT No.: PCT/EP92/02947
  § 371 Date: Aug. 23, 1993
  § 102(e) Date: Aug. 23, 1993
[87] PCT Pub. No.: WO93/12956
  PCT Pub. Date: Jul. 8, 1993

[30] Foreign Application Priority Data
Dec. 27, 1991 [CH] Switzerland .................... 3840/91

[51] Int. Cl.6 .................... A62B 37/00; B25F 1/00; B26B 29/02
[52] U.S. Cl. .................... 206/573; 7/144; 7/158; 30/123; 206/223; 206/232; 206/578
[58] Field of Search .............. 7/144, 158; 30/123, 30/162, 280, 294; 206/223, 228, 234, 349, 570, 803, 38, 232, 573, 578, 225; 354/76

[56] References Cited
U.S. PATENT DOCUMENTS

| | | | |
|---|---|---|---|
| 3,929,223 | 12/1975 | Ludeman | 206/234 |
| 4,002,236 | 1/1977 | Tolleson | 206/803 |
| 4,134,206 | 1/1979 | Beermann | 30/294 |
| 4,592,467 | 6/1986 | Lechner | 206/349 |
| 4,685,213 | 8/1987 | Powers | 30/123 |
| 4,815,211 | 3/1989 | Garcia | 30/162 |
| 5,097,599 | 3/1992 | Hasegawa | 30/123 |
| 5,251,351 | 10/1993 | Klotz | 7/158 |

FOREIGN PATENT DOCUMENTS

| | | | |
|---|---|---|---|
| 0195720 | 1/1920 | Canada | 7/144 |
| 3224821 | 1/1983 | European Pat. Off. | |
| 2605477 | 7/1977 | Germany | |
| 2826749 | 1/1980 | Germany | |
| 2944879 | 5/1981 | Germany | |
| 0537823 | 7/1973 | Switzerland | |

*Primary Examiner*—Jimmy G. Foster
*Attorney, Agent, or Firm*—Frost & Jacobs

[57] ABSTRACT

The motor-vehicles emergency equipment described consists of a hollow multi-section rod (1) with, at one end (2), a knife blade (24) and a striker (22). The equipment is designed to be kept in an easily accessible place in the vehicle so that it can be used to free the occupants rapidly in an emergency by cutting the safety belt with the knife blade (24) and, if necessary, breaking the windows with the striker (22). Kept in the same end of a rod are a folded-up accident-reporting form, a folding accident warning triangle, wax crayons, pens and a small lamp. Kept in other parts of the rod are a roll of measuring tape, a disposable camera and a flashing light. Various special accessories are thus kept in individual sections of the hollow rod for use in an emergency, in particular in the event of car accident.

8 Claims, 1 Drawing Sheet

EMERGENCY EQUIPMENT FOR MOTOR VEHICLES

FIELD OF THE INVENTION

The present invention relates to emergency equipment for motor vehicles for use in traffic accidents.

BACKGROUND OF THE INVENTION

As is generally known, the occupants of motor vehicles which come to a standstill are particularly endangered in case of reduced visibility, poor road conditions and dense traffic, while the prescribed warning triangles, or emergency reflective triangles, are unable to provide adequate protection in some cases, especially when they are either not easily accessible or damaged, incorrectly erected, or sometimes even are missing.

The occupants of motor vehicles are moreover in some cases endangered after road accidents because they do not undo the safety belts or open the doors or windows and thus can not free themselves from the vehicle. When road accidents occur, assistance moreover does not always come in time to avoid further accidents.

After a traffic accident it is moreover required to draw up an accident report but this is often difficult and uncertain, the necessary materials (accident-reporting form, pens, measuring tape, wax crayons lamp etc.) either being absent or not easily accessible. In bad weather and under poor road conditions there is among other things the danger of pileups of several vehicles.

SUMMARY OF THE INVENTION

The object of the present invention is to provide an emergency equipment for motor vehicles which provides improved protection of the occupants especially in the case of road accidents and which can largely take the above-mentioned problems and dangers into account.

This object is met in accordance with the invention by the emergency equipment having the features defined in claim 1.

This emergency equipment is characterized in that it forms a hollow, closed, rigid, multi-section rod having a first, elongated, closed end-section which is provided with a knife and a striker in such a manner as to allow safety belts to be cut and vehicle windows to be smashed in an emergency in order to rapidly free the occupants of the vehicle.

Said hollow rod consists of several sections which are rigidly connected to each other at their front faces by means of fastening elements so that the hollow rod may be stowed as a whole by means of a holder in the vehicle so as to be easily accessible and may serve in an emergency to immediately and rapidly free the occupants by means of the knife and the striker.

DESCRIPTION OF THE DRAWINGS

The individual sections of the hollow rod are designed to contain various special accessories for use in an emergency. Said first end section is here advantageously subdivided into two coaxial compartments in such a manner that an outer, annular compartment can serve to house a rolled-up accident-reporting form and a central compartment can serve to house a collapsible accident-warning triangle.

Said first end section advantageously comprises several longitudinal holes for accommodating wax crayons or pens and a small lamp outside the outer, annular compartment. These longitudinal holes may be designed as an element of a plug connection for the next section or a corresponding cover.

Said knife is preferably mounted in such manner on the inner side of a clip which is attached to the end of the first end section that it may be slipped under a tightened safety belt in order to cut through the belt in an emergency.

A special measuring tape roll advantageously forms one section of the hollow rod so that the measuring tape is directly available.

A special, disposable camera with a flashlight and a special flashing light or flasher lamp advantageously constitute respective sections of the hollow rod.

The invention will now be explained by means of an embodiment and the accompanying drawings which show the following.

Figure 1:
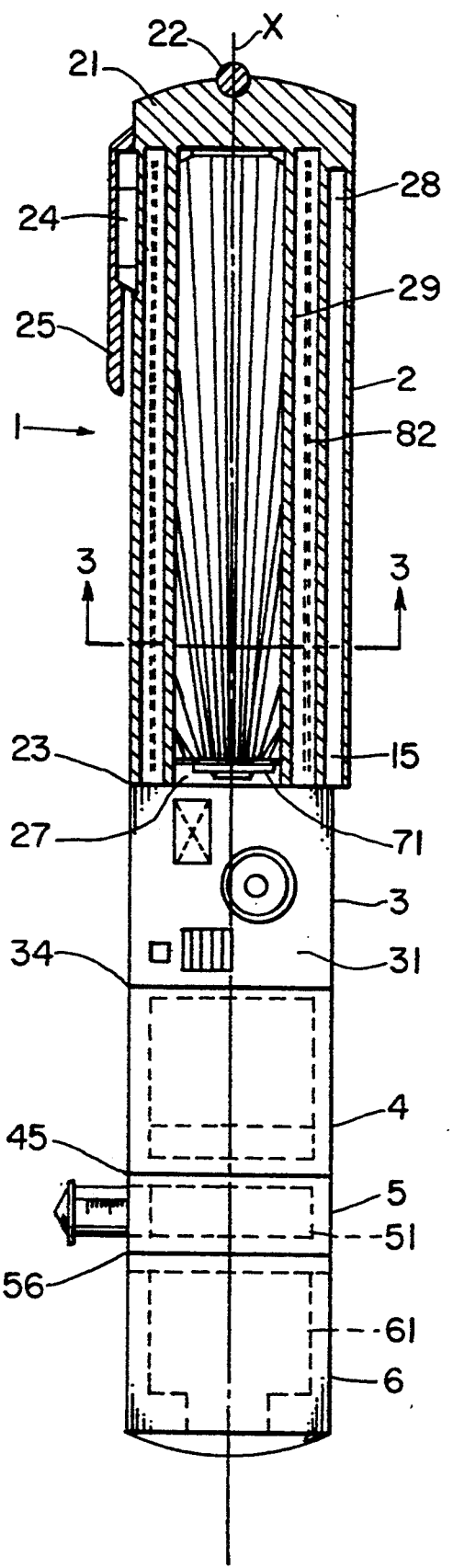

FIG. 1 shows a partial longitudinal section along I—I in FIG. of the emergency equipment according to one embodiment of the invention.

Figure 2:
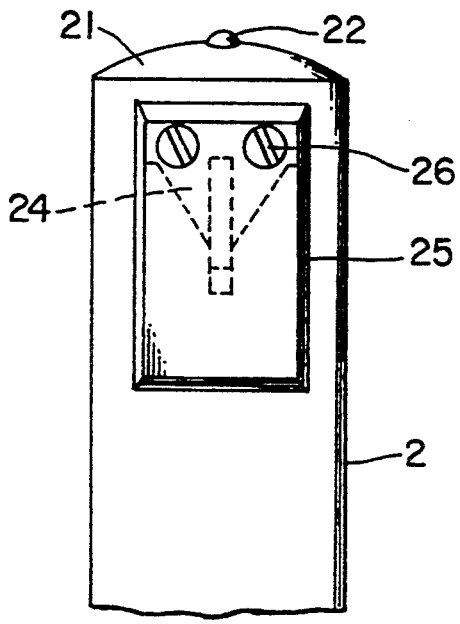

FIG. 2 shows a partial view of the emergency equipment according to FIG. 1.

Figure 3:
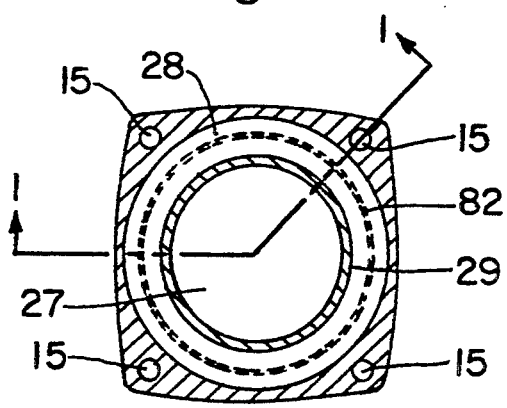

FIG. 3 shows a section along III—III in FIG. 1.

Figure 4:
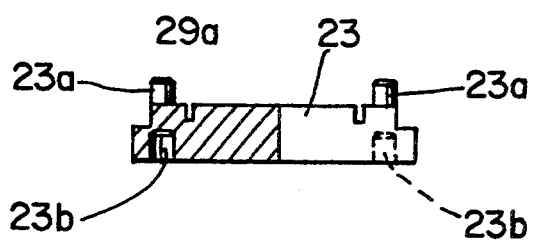

FIG. 4 shows a partial section of an example of a connecting element of the emergency equipment according to FIG. 3.

DETAILED DESCRIPTION OF THE INVENTION

The emergency equipment shown schematically in FIG. I essentially forms a multi-section hollow rod 1 which consists in this embodiment of five contiguous sections 2 to 6 of the hollow rod with square cross-section, which are aligned along a longitudinal axis X and are fastened together by means of connecting elements which are only indicated schematically by the lines 23, 34, 45, 56.

The first, elongated end section 2 of this hollow rod 1 is on one hand closed off at its free end by a rigid end-wall 21, to which a striker head in the form of a steel ball 22 is fixed, this first end section 2 being on the other hand equipped with a knife 24 serving to rapidly cut the tightened safety belts in an emergency.

For that purpose, the knife 24 is disposed between the side wall of the end section 2 and a rounded clip 25 and is secured therewith to this side wall by means of two screws 26 (FIG. 2).

This knife 24 consists essentially of a blade in the form of a triangular plate with a cutting surface which is turned away from the end wall, arranged in the gap between the clip 25 and the side wall of the end section 2, the size of this gap being designed to enable the rapid insertion of a tightened safety belt so that the belts may be cut immediately in an emergency.

As is more particularly apparent from FIGS. 1 and 3, an elongated, central compartment 27 and a coaxial, annular compartment 28 are provided in the end section 2. These coaxial compartments 27 and 28 are on one hand separated from each other by a cylindrical partition 29, which here forms one piece with the end wall 21, the periphery of the annular compartment 28 being on the other hand defined by the wall of a cylindrical cavity in the end section 2. The length of the end section 2 or the annular compartment 28 and their width are on one hand specially designed so that this annular compartment 28 can contain a folded-up accident-reporting form 82, which is only represented schematically by dashed lines in FIGS. 1 and 3.

The diameter and the length of the cylindrical partition 29 and the end section 2 are on the other hand respectively designed to allow a special, foldable or extensible accident-warning triangle 71 to be kept in the central compartment 27.

This accident-warning triangle 71 is represented schematically in FIG. 1 and may be specially designed for example in the same way as an umbrella which is collapsible in both its length and its width, is contained in the central compartment 27 and after being taken out is unfolded to provide a warning triangle, which advantageously forms a three-sided pyramid that remains stable and visible in various positions.

This special warning triangle may, however, have any suitable, collapsible form, so long as it complies with the legal norms when in it is unfolded.

As may be seen from FIGS. 1 and 3, three longitudinal holes 15 (see FIG. 3) are further provided in the wall 20 of the end section 2, outside the annular compartment 28 and in the corners of the square profile of the hollow rod, and their size is designed to allow them to contain wax crayons or pens (not shown) and a small lamp for use when drawing up the accident report.

FIG. 3 shows particularly that the lateral faces of the end section 2 and of the entire hollow rod 1 are respectively curved outwardly and designed as a grip handle to facilitate manipulation of the hollow rod.

As may be seen from FIG. 1, a second end section 6 of the hollow rod 1 is designed in the form of a special blinking or flashing lamp 61 which is only shown schematically in dashed lines, is particularly adapted to the profile of the hollow rod 1 and is rigidly connected to the adjacent section 5 by means of suitable connecting elements 56 which are shown schematically. These connecting elements 56 are moreover designed to allow the lamp 61 to be easily removed from the hollow rod 1 and used immediately in case of an emergency. This special blinking lamp 61 may be operated with incorporated batteries or else may be provided with a cable with a plug for connection to the cigar lighter of the vehicle.

In the intermediate section 3, the emergency equipment according to FIG. 1 further comprises a very small, special disposable camera 31 with a flashlight, which is likewise adapted to the shape of the hollow rod I and is rigidly secured to the adjacent sections 2 and 4 by means of suitable connecting elements 23 and 34, so that the hollow rod 1 may constitute, as a whole, a rigid body of adequate strength.

These connecting elements 23 and 34 are likewise designed to allow this special disposable camera 31 to be easily removed from the hollow rod 1 and to be immediately used in an emergency for drawing up an accident report.

In the section 5, the emergency equipment according to FIG. 1 further comprises a measuring tape roll 51, which is likewise adapted to the shape of the hollow rod 1 and is rigidly secured to the adjacent sections 4 and 6 of the hollow rod by means of connecting elements 45 and 56, the latter also being designed to allow this measuring tape roll 51 to be easily removed from the hollow rod 1 and used immediately for recording in an emergency for drawing up an accident report.

FIG. 4 shows an example of a connecting element 23 in the form of a plate which covers the first end section 2 of the hollow rod, comprises an annular notch 29a for receiving the front end of the cylindrical partition 29, on one hand engages via four pins 23 in the respective holes 15 of the end section 2 and is rigidly secured thereto and is on the other hand provided with four holes 23b for receiving corresponding pins, not shown, at the front face of the second section 2 in such a manner that this element 3 provides a plug connection for the sections 2 and 3 of the hollow rod.

The hollow rod 1 is further provided here with another section 4 designed to contain medicaments or other auxiliary materials which may be useful in an emergency.

It may be seen from this description that the emergency equipment in the form of a multi-section hollow rod according to the invention may first be employed as a tool to rapidly free the occupants of a motor vehicle in case of an emergency, namely, to cut the safety belts and smash the windows, while it serves on the other hand to keep ready and protect the most important equipment for correctly drawing up an accident report.

The emergency equipment according to the invention is preferably provided with easily separable connecting means for mounting it in any suitable place in the vehicle within reach of the driver or the occupants.

One may also advantageously employ the multi-section hollow rod according to the invention as a warning rod and a luminous paint may be spirally arranged on its outer surface for that purpose.

The sections of the hollow rod may be assembled and rigidly connected with fastening means of any suitable type. To this end, one may also use other connections than the described connecting elements, for example connecting elements or strip connections with press fasteners etc. A strap may be provided here in order to facilitate manipulation of the hollow rod.

The knife provided according to the invention may likewise be mounted, in similar manner to the described clip, on a lateral knob designed as a part of the outer wall surface of the section 2.

The striker provided in accordance with the invention may also advantageously consist of a steel cap mounted at the free front face of the end section 2, so that the windows may be smashed in an emergency by means of a swinging movement of the hollow rod.

I claim:

1. Emergency equipment for a motor vehicle for use in traffic accidents, characterized by:
   (a) said equipment consisting of a hollow, closed, rigid, rod (1) having a number of sections (2–6) including a first, elongated, closed end section (2), a knife means (24) mounted on said first section (2) for cutting a safety belt to free an occupant therefrom and a striker means (22) mounted on said first section to smash a vehicle window for escape of the occupant from said vehicle;
   (b) fastening means (23, 34, 45, 56) for rigidly and removably fastening said sections (2–6) together end-to-end; and
   (c) various accessories for emergency use being stored within said sections (2–6) of said rod (1).

2. The emergency equipment according to claim 1 characterized by a longitudinal central, axial compartment (27) and an annular longitudinal compartment (28) surrounding said central compartment (27) and formed in said first closed end section (2), a rolled-up accident-reporting form in said annular compartment (28) and a collapsible accident-warning triangle in said central compartment.

3. The emergency equipment according to claim 1 or 2 characterized by several longitudinal bores (15) formed in said first closed end section (2) outside said annular compartment (28), wax crayons or pens and a small lamp being located within said bores (15).

4. The emergency equipment according to claim 3 characterized in that said longitudinal bores (15) comprise an element of a plug for connection to the next one of said sections (3–6) or of a corresponding cover.

5. The emergency equipment according to claim 1 characterized by a clip (25) affixed to the exterior of said first end section (2), said knife means (24) being mounted on said clip (25) between said clip (25) and said first end section (2) such that said knife means (24) can be slipped under a tightened safety belt in an emergency, whereby in an emergency said belt can be severed without injury to the vehicle occupant.

6. The emergency equipment according to claim 1 characterized by a rolled measuring tape (51) being located in one of said rod sections (2–6)

7. The emergency equipment according to claim 1 characterized by a special, disposable camera (31) with a flashlight being housed in one of said sections (2–6) of said rod (1).

8. The emergency equipment according to claim 1 characterized by a flashing or blinking light (61) being located in one of said sections (2–6) of said rod (1).

* * * * *